(12) United States Patent
Kim

(10) Patent No.: US 7,080,204 B2
(45) Date of Patent: Jul. 18, 2006

(54) CACHE CONTROLLER COMPUTER SYSTEM AND METHOD FOR PROGRAM RECOMPILATION

(75) Inventor: Jin-Cheon Kim, Youngin (KR)

(73) Assignee: Samsung Electronics Co. Ltd., Gyeonggi-do (KR)

( * ) Notice: Subject to any disclaimer, the term of this patent is extended or adjusted under 35 U.S.C. 154(b) by 344 days.

(21) Appl. No.: 10/648,437

(22) Filed: Aug. 27, 2003

(65) Prior Publication Data

US 2004/0158825 A1  Aug. 12, 2004

(30) Foreign Application Priority Data

Feb. 6, 2003  (KR)  ............... 10-2003-0007414

(51) Int. Cl.
*G06F 12/08* (2006.01)
(52) U.S. Cl. ...................... 711/118; 717/149
(58) Field of Classification Search ............... 711/118; 717/148, 153, 166, 149
See application file for complete search history.

(56) References Cited

U.S. PATENT DOCUMENTS

| | | | | |
|---|---|---|---|---|
| 6,061,710 | A * | 5/2000 | Eickemeyer et al. | 718/107 |
| 6,289,369 | B1 | 9/2001 | Sundaresan | 709/103 |
| 6,470,443 | B1 | 10/2002 | Emer et al. | 712/205 |
| 2002/0144060 | A1 | 10/2002 | Stoodley | 711/118 |

FOREIGN PATENT DOCUMENTS

| | | |
|---|---|---|
| JP | 05-324580 | 12/1993 |
| WO | WO 91/20033 | 12/1991 |

* cited by examiner

*Primary Examiner*—Hiep T. Nguyen
(74) *Attorney, Agent, or Firm*—Harness, Dickey & Pierce, P.L.C.

(57) ABSTRACT

A computer system which dynamically extracts multiple threads from a program using a thread binary compiler (TBC), and a simultaneous multithreading (SMT) method. The computer system loads the TBC to a cache and controls the cache such that the TBC divides the program into multiple threads, and the cache loads the program as a recompiled program, whenever the cache loads a program stored in main memory.

22 Claims, 3 Drawing Sheets

CACHE CONTROLLER COMPUTER SYSTEM AND METHOD FOR PROGRAM RECOMPILATION

BACKGROUND OF THE INVENTION

This application claims priority from Korean Patent Application No. 2003-7414, filed on 6 Feb. 2003, in the Korean Intellectual Property Office, the disclosure of which is incorporated herein in its entirety by reference.

1. Field of the Invention

The present invention relates to a cache controller of a computer system, and more particularly, simultaneous multithreading of a computer system and method for program recompilation and dynamic extraction of multiple threads.

2. Description of the Related Art

A central processing unit (CPU) is typically pipelined so that several computer instructions are performed simultaneously during a clock cycle, thus improving CPU performance. Still, data dependencies, resource dependencies, control dependencies, and cache misses cause vertical and horizontal wastes during which computer instructions cannot be executed.

In contrast, according to simultaneous multithreading (hereinafter, referred to as SMT), multiple threads reside in the CPU during a clock cycle and the instructions from each thread are executed simultaneously. In particular, the instructions are executed to eliminate vertical and horizontal waste. As a result, the waste is minimized and thus CPU performance is improved. A thread is typically defined as a point of control within a process, a process execution path, or a program. In other words, SMT enables instructions from threads to be executed simultaneously, thereby increasing the rate of instruction execution throughput. U.S. Pat. No. 6,470,443 has disclosed algorithms related to an STM method.

As such, generating threads and processing the generated threads using an SMT processor are key factors for improving computer system performance. A thread generation method is implemented in hardware or software and directly related to the number of threads that are generated by dividing an input program.

When the thread generation method is implemented in hardware, a program sequence is detected by the hardware and the input program is dynamically divided into multiple threads. Therefore, this method is often referred to as dynamic multithreading (DMT). However, this method requires more hardware devices as the complexity of circuit and logic increases, which makes it difficult to implement the thread generation method in hardware.

When the thread generation method is implemented in software, a compiler statically divides the input program into multiple threads. In this case, a user compiles source code or recompiles binary code using an application program. However, this method prevents the user from flexibly manipulating the binary system. Moreover, this method is not suitable in that the user interprets and directly recompiles the binary code.

SUMMARY OF THE INVENTION

In exemplary embodiments, the present invention provides a computer system which can use a thread binary compiler (TBC) to create native binary code by dynamically extracting multiple threads from a program.

In an exemplary embodiment of the present invention provides a cache controller system which dynamically controls a cache so that a thread binary compiler divides a program into multiple threads and loads the program as a recompiled program whenever the cache loads the program from main memory and forwards the threads to a simultaneous multithreading process for processing.

In a further exemplary embodiment of the present invention also provides a simultaneous multithreading (SMT) method of a computer system that can use a thread binary compiler (TBC) to create native binary code by dynamically extracting multiple threads from a program, i.e., a target binary.

In another exemplary embodiment of the present invention, there is provided a computer system. The computer system includes optionally a hard disk or flash memory, a main memory, a cache, a cache controller, and a simultaneous multithreading processor. The cache controller dynamically controls the cache such that a thread binary compiler can divide a program into multiple threads and loads the program as a recompiled program whenever the cache can load the program from the main memory.

In another exemplary embodiment, the simultaneous multithreading processor processes instructions from the threads such that the instructions from each thread can be executed simultaneously by taking advantage of minimized horizontal and vertical wastes.

In another exemplary embodiment, the cache stores a plurality of recompiled programs generated from a plurality of programs.

In another exemplary embodiment, the recompiled program has a different instruction set architecture than the structure of the program loaded into the main memory. The recompilation may be performed at an instruction level of the program.

In another exemplary embodiment, the thread binary compiler is software residing in the main memory or optionally is loaded into and operates in the cache whenever the thread binary compiler recompiles the program.

In another exemplary embodiment, once the recompiled program has completed execution, the recompiled program is deleted or optionally stored in the main memory.

In another exemplary embodiment, if the main memory is full, the recompiled program stored in the main memory is deleted or optionally stored in the hard disk/flash memory.

In another exemplary embodiment of the present invention, there is provided a simultaneous multithreading method of a computer including, optionally, a hard disk or a flash memory, a main memory, a cache, a cache controller, and a simultaneous multithreading processor. In the simultaneous multithreading method, a program can be loaded into the main memory from one of the hard disk or flash memory, using the computer system. A thread binary compiler can be loaded to the cache, using, for example, the cache controller. The cache can be dynamically controlled such that the thread binary compiler can divide the program into multiple threads. The program can be loaded as a recompiled program, using the cache controller, whenever the cache loads the program from the main memory. Instructions from threads can be processed using the simultaneous multithreading processor such that the instructions from threads can be executed simultaneously by taking advantage of minimized horizontal and vertical waste.

BRIEF DESCRIPTION OF THE DRAWINGS

The above and other features and advantages of the present invention will become more apparent by describing in detail several exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
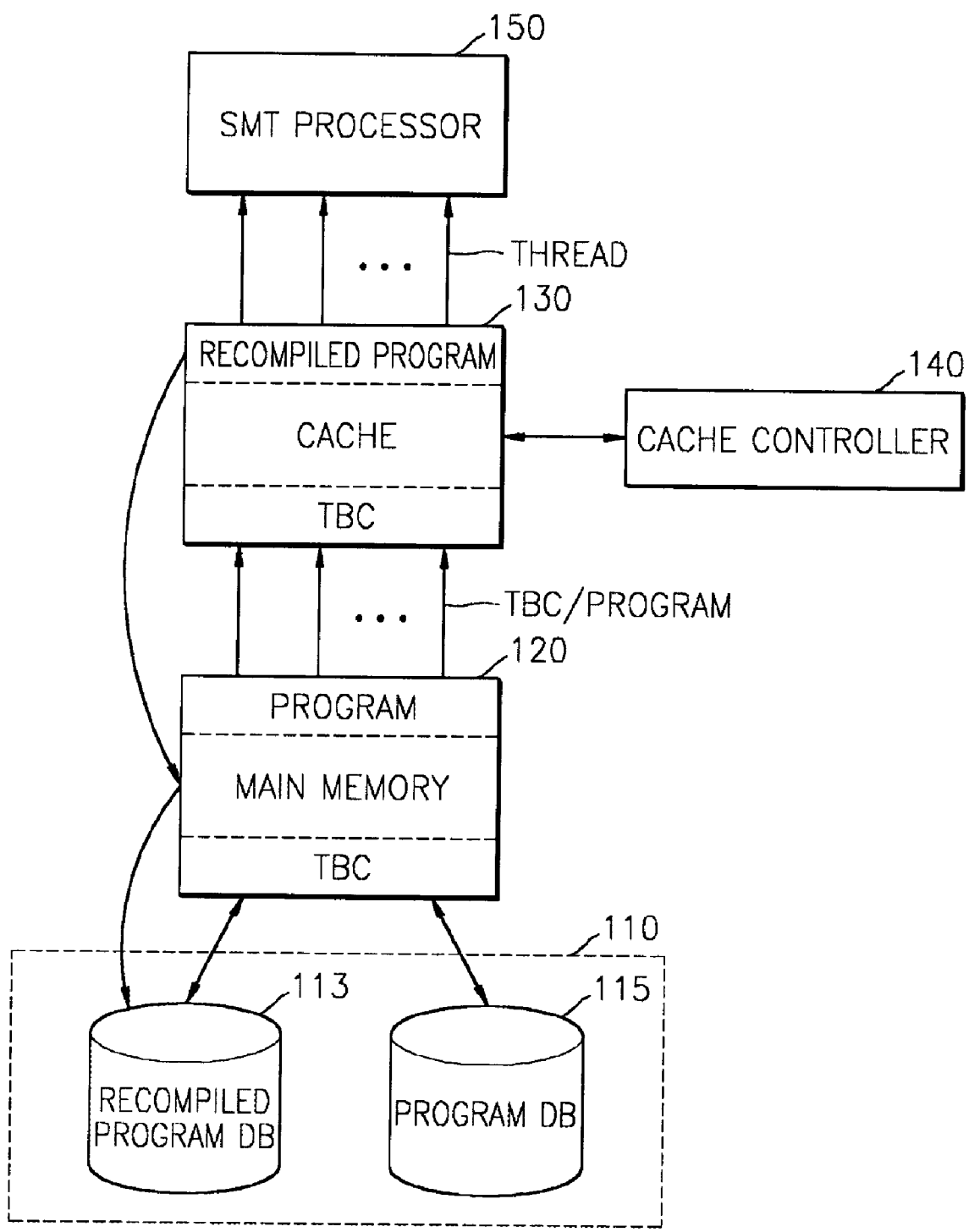
FIG. 1 a block diagram of a computer system according to an exemplary embodiment of the present invention.

FIG. 1 is a block diagram of a computer system according to an exemplary embodiment of the present invention.

Referring to FIG. 1, the computer system includes a hard disk/flash memory 110, a main memory 120, a cache 130, a cache controller 140, and a simultaneous multithreading (hereinafter, referred to as SMT) processor 150. The SMT processor 150 is a type of general central processing unit (CPU).

The hard disk/flash memory 110 can be similar to high-capacity memory of a general computer and composed of a recompiled program database (DB) 113 for storing recompiled programs and a program database (DB) 115 for storing basic or application programs.

The main memory 120 is optionally mounted between the SMT processor 150 and the hard disk/flash memory 110, and can reduce the time necessary for the SMT processor 150 to read data from and write data to the hard disk/flash memory 110, thereby improving the operating speed of the computer.

The cache 130 is temporary storage optionally mounted between the SMT processor 150 and the main memory 120. When the SMT processor 150 reads data from or writes data to the main memory 120, the cache 130 stores a copy of the data and the address of the main memory 120 to reduce the time necessary for read and write operations of the SMT processor 150. This operation increases the operating speed of a computer.

Whenever the program, previously loaded from the hard disk/flash memory 110 to the main memory 120, is loaded from the main memory 120 to the cache 130, the cache controller 140 can dynamically control the cache 130 such that a thread binary compiler (hereinafter, referred to as a TBC) may divide the program into multiple threads. The cache 130 then can load the program as a recompiled program.

The SMT processor 150 processes instructions from threads such that instructions from threads can be executed simultaneously by taking advantage of minimized horizontal and vertical waste.

The cache 130 stores a plurality of recompiled programs generated from a plurality of programs.

The recompiled program may have a different instruction set architecture (ISA) than that of the program loaded into the main memory 120. The recompilation can be performed at the instruction level of the program.

The TBC is software residing in the main memory 120. Whenever the TBC recompiles a program, the TBC can be loaded into and operates in the cache 130.

Once the recompiled program has completed execution, the recompiled program is deleted or optionally stored in the main memory 120.

If the main memory 120 is full, the recompiled program stored in the main memory 120 is deleted or optionally stored in at least one of a hard disk/flash memory 110 for reuse. Any reuse of the recompiled program does not involve further recompiling.

Hereinafter, the operation of the computer system of the present invention will be described.

Figure 2:
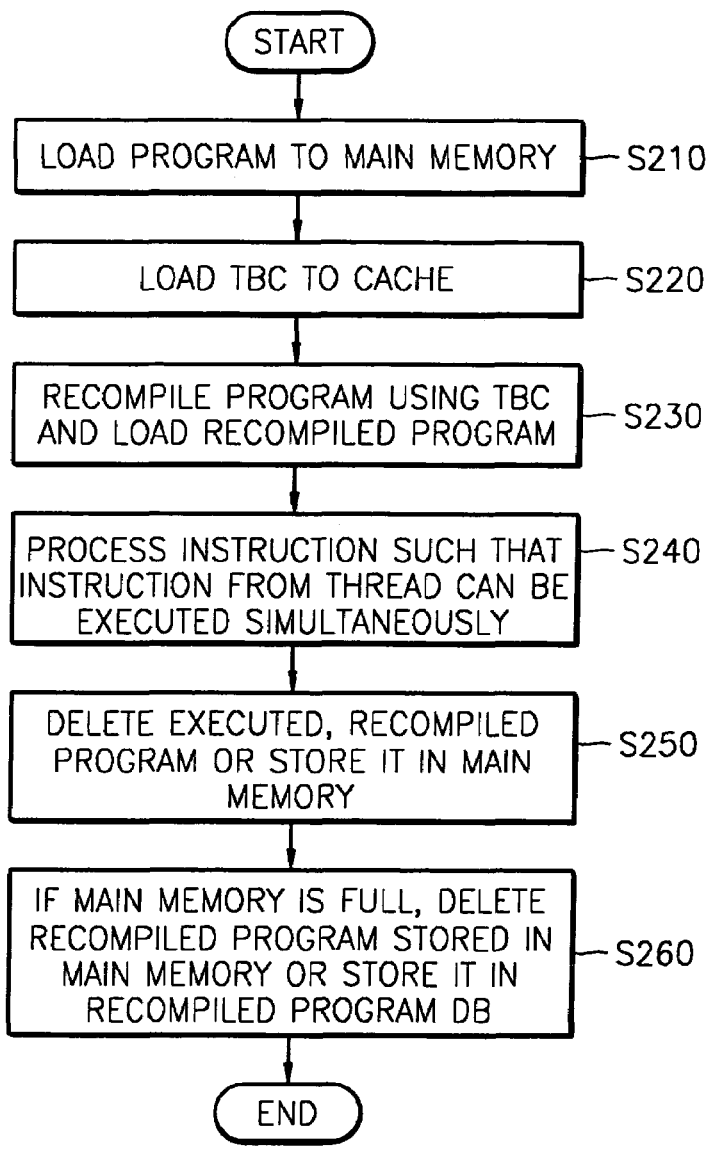
FIG. 2 is a flowchart for explaining the operation of the computer system of FIG. 1.

FIG. 2 is an exemplary flowchart for explaining the operation of the computer system according to FIG. 1.

Referring to FIG. 2, the computer system of FIG. 1, including the hard disk/flash memory 110, the main memory 120, the cache 130, the cache controller 140, and the SMT processor 150, performs simultaneous multithreading (SMT) as follows.

In the first step S210, the computer system loads a program from the hard disk/flash memory 110 into the main memory 120. In other words, a basic program or optionally, application program, which can be stored in the hard disk/flash memory 110 when the user boots the computer or commands execution during runtime, is loaded into and can be stored in the main memory 120. The source codes of the basic programs or, optionally, application programs, stored in the hard disk/flash memory 110, can have various instruction set architectures (ISA) with respect to the operating system of the computer.

In step S220, the cache controller 140 loads a TBC into the cache 130 from the main memory 120. Then, in step S230, the cache controller 140 dynamically controls the cache 130 such that the TBC divides the program into multiple threads and the cache 130 loads the program as a recompiled program, whenever the cache 130 loads the program stored in the main memory 120.

The TBC resides in the main memory 120, and is loaded into and executed in the cache 130 whenever the TBC recompiles a program.

In the next step S240, the SMT processor 150 processes thread instructions, such that the instructions from threads are executed simultaneously by taking advantage of minimized horizontal and vertical waste.

Figure 3:
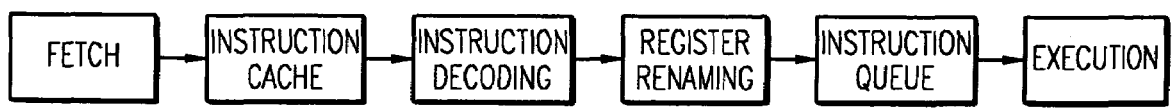
FIG. 3 is an exemplary view for explaining the conventional function of a simultaneous multithreading (SMT) processor.

FIG. 3 is an exemplary view for explaining the function of the SMT processor 150.

Referring to FIG. 3, the SMT processor 150 receives the threads from the cache 130 and fetches an instruction address corresponding to each thread, using a program counter. Thus, the instructions from threads can be executed simultaneously by taking advantage of minimized horizontal and vertical waste. The instructions corresponding to the fetched address are read from the cache 130 and executed through instruction decoding, register renaming, and instruction queuing. The general operation of the SMT processor 150 has been disclosed in U.S. Pat. No. 6,470,443.

Figure 4:
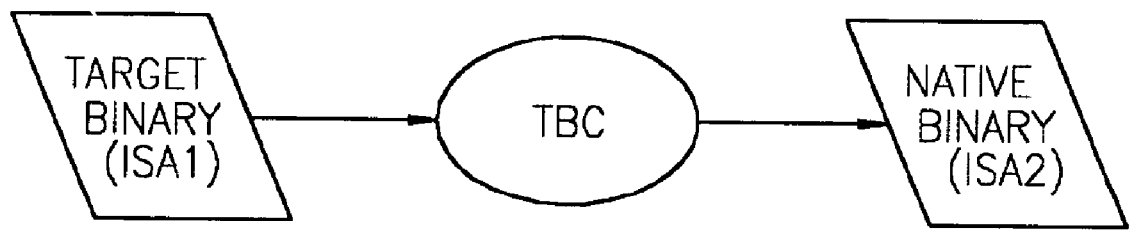
FIG. 4 is an exemplary view for explaining the instruction set architecture (ISA) conversion performed by a thread binary compiler (TBC)

FIG. 4 is an exemplary view for explaining instruction set architecture (ISA) conversion performed by the TBC.

Referring to FIG. 4, the basic program or application program that is loaded into the main memory 120 from the hard disk/flash memory 110, i.e., a target binary (machine code generated by interpreting the source code of the basic program or application program, using a general compiler) has an instruction set architecture ISA1. Thus, the target binary can be recompiled by the cache controller 140 into native binary with the structure of an instruction set architecture ISA2. The native binary can be loaded into the cache 130 (step S230 of FIG. 2).

Figure 5:
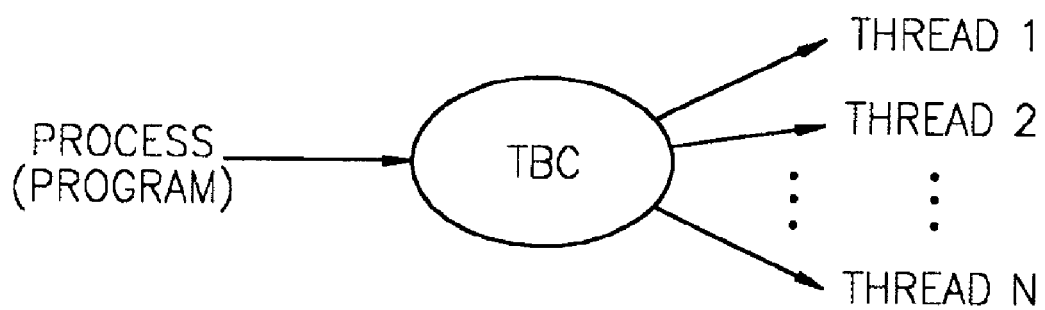
FIG. 5 is an exemplary view for explaining program processing of the thread binary compiler (TBC)
Figure 6:
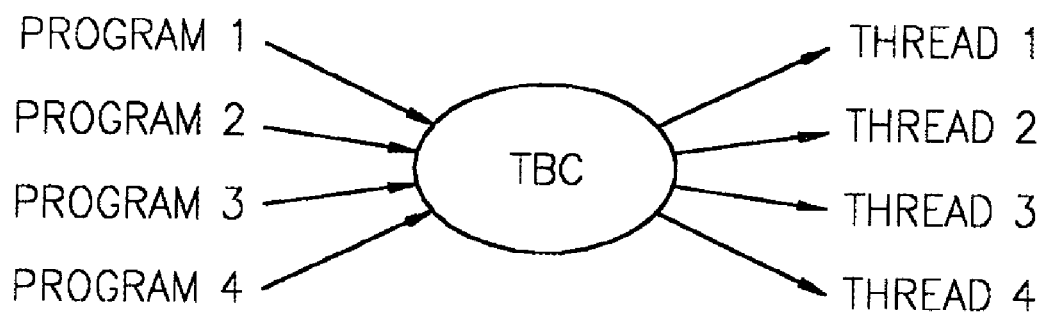
FIG. 6 is an exemplary view for explaining multi-program processing of the thread binary compiler (TBC).

FIG. 5 is an exemplary view for explaining program processing of the TBC. FIG. 6 is an exemplary view for explaining multi-program processing of the TBC.

Referring to FIGS. 5 and 6, the cache controller 140 recompiles a process (program) loaded into the main memory 120 or optionally recompiles a group of programs, using the TBC, and then loads a recompiled program or multiple recompiled programs into the cache 130 (step S230 of FIG. 2). A recompiled program may be composed of multiple threads and each thread may be composed of a plurality of instructions.

During TBC recompilation, the TBC detects the sequence of the program, which is loaded from the main memory 120, and dynamically divides the program into multiple threads (step S230 of FIG. 2). In order to achieve the optimal operating speed of the computer, the recompilation is performed at the instruction level of the program.

Once the recompiled program has completed execution, the recompiled program is deleted or optionally stored in the main memory 120 (step S250 of FIG. 2). If the main memory 120 is full, the recompiled program stored in the main memory 120 is deleted or optionally stored in recompiled database 113 of the hard disk/flash memory 110 for reuse (step S260 of FIG. 2). Any reuse of the recompiled program does not involve further recompiling.

As described above, an exemplary embodiment of the computer system loads a program into the main memory 120 from the hard disk/flash memory 110. Whenever the cache 130 loads the program stored in the main memory 120, the cache controller 140 loads the TBC into the cache 130 and dynamically controls the cache 130, such that the TBC divides the program into multiple threads and the cache 130 loads the program as a recompiled program. The operation of the cache controller 140 allows minimization of horizontal and vertical waste so that the instructions from threads can be executed simultaneously.

According to another exemplary embodiment, the TBC dynamically extracts multiple threads from a program during runtime and can apply the extracted threads to the SMT processor. As a result, the performance of the computer system may be improved by a user's TBC for binary recompilation without user's direct interpretation.

While exemplary embodiments of the present invention have been particularly shown and described, it will be understood by those of ordinary skill in the art that various changes in form and details may be made therein without departing from the spirit and scope of the present invention as defined by the following claims and their equivalents.

What is claimed is:

1. A computer system comprising:
   a main memory;
   a cache;
   a cache controller, which dynamically controls the cache such that a thread binary compiler divides a program into multiple threads and loads the program as a recompiled program whenever the cache loads the program from the main memory; and
   a simultaneous multithreading processor, which processes instructions from threads such that the instructions from each thread can be executed simultaneously.

2. The computer system of claim 1, wherein the cache stores a plurality of recompiled programs generated from a plurality of programs.

3. The computer system of claim 1, wherein the recompiled program has a different instruction set architecture than the structure of the program loaded into the main memory.

4. The computer system of claim 1, wherein the recompilation is performed at an instruction level of the program.

5. The computer system of claim 1, wherein the thread binary compiler is software residing in the main memory.

6. The computer system of claim 1, wherein the thread binary compiler is loaded into and operates in the cache whenever the thread binary compiler recompiles the program.

7. The computer system of claim 1, wherein once the recompiled program has completed execution, the recompiled program is deleted.

8. The computer system of claim 1, wherein once the recompiled program has completed execution, the recompiled program is stored in the main memory.

9. The computer system of claim 8, wherein if the main memory is full, the recompiled program stored in the main memory is deleted.

10. The computer system of claim 8, wherein if the main memory is full, the recompiled program stored in the main memory is stored in the hard disk/flash memory.

11. A simultaneous multithreading method comprising;
    loading a program into a main memory; loading a thread binary compiler to a cache;
    dynamically controlling the cache such that the thread binary compiler divides the program into multiple threads and loads the program as a recompiled program, using the cache controller, whenever the cache loads the program from the main memory; and
    processing instructions from threads such that the instructions from threads, using a simultaneous multithreading processor can be executed simultaneously.

12. The simultaneous multithreading method of claim 11, wherein the cache stores a plurality of recompiled programs generated from a plurality of programs.

13. The simultaneous multithreading method of claim 11, wherein the recompiled program has a different instruction set architecture than the structure of the program loaded into the main memory.

14. The simultaneous multithreading method of claim 11, wherein the recompilation is performed at an instruction level of the program.

15. The simultaneous multithreading method of claim 11, wherein the thread binary compiler is software residing in the main memory.

16. The simultaneous multithreading method of claim 11, wherein the thread binary compiler is loaded into and operates in the cache whenever the thread binary compiler recompiles the program.

17. The simultaneous multithreading method of claim 11, wherein once the recompiled program has completed execution, the recompiled program is deleted.

18. The simultaneous multithreading method of claim 11, wherein once the recompiled program has completed execution, the recompiled program is stored in the main memory.

19. The simultaneous multithreading method of claim 18, wherein if the main memory is full, the recompiled program stored in the main memory is deleted.

20. The simultaneous multithreading method of claim 18, wherein if the main memory is full, the recompiled program stored in the main memory is stored in the hard disk/flash memory.

21. A computer system comprising:
    a main memory;
    a cache;

cache controller means for dynamically controlling the cache such that a thread binary compiler divides a program into multiple threads and loads the program as a recompiled program whenever the cache loads the program from the main memory; and a simultaneous multithreading processor, which processes instructions from threads such that the instructions from each thread can be executed simultaneously.

22. A cache controller system comprising:

a cache;

a main memory;

a cache controller wherein said cache controller dynamically controls the cache so that a thread binary compiler divides a program into multiple threads and loads the program as a recompiled program whenever the cache loads the program from the main memory and forwards the threads to a simultaneous multithreading processor for processing.

* * * * *